United States Patent [19]
Schiffmann

[11] Patent Number: 6,038,495
[45] Date of Patent: Mar. 14, 2000

[54] VEHICLE ROLLOVER SENSING USING SHORT-TERM INTEGRATION

[75] Inventor: Jan Konried Schiffmann, Newbury Park, Calif.

[73] Assignee: Delco Electronics Corporation, Kokomo, Ind.

[21] Appl. No.: 09/020,137

[22] Filed: Feb. 6, 1998

[51] Int. Cl.$^7$ .................................................. B60R 21/13
[52] U.S. Cl. .............................. 701/1; 180/282; 280/735; 340/440
[58] Field of Search .................................. 701/1, 29, 45, 701/46; 180/268, 282; 280/707, 734, 735; 340/438, 440

[56] References Cited

U.S. PATENT DOCUMENTS

| | | | |
|---|---|---|---|
| 5,610,575 | 3/1997 | Gioutsos | 701/45 |
| 5,825,284 | 10/1998 | Dunwoody et al. | 340/440 |
| 5,835,873 | 11/1998 | Darby et al. | 701/45 |

FOREIGN PATENT DOCUMENTS

| | | | |
|---|---|---|---|
| 196 06 043 A1 | 8/1997 | Germany . | |
| 196 09 176 A1 | 9/1997 | Germany . | |
| 196 09 717 A1 | 9/1997 | Germany . | |

OTHER PUBLICATIONS

Mike Horton, Charles Kitchin, "A Dual–Axis Tilt Sensor Based on Micromachined Accelerometers", Sensors, Apr. 1996, pp 91–94.

Steiner, Weidel, Kublbeck, Steurer, Hora, "Roll Over Detection", SAE Technical Paper Series, Feb. 24–27. 1997, pp 45–49.

P.E.M. Frere, "Problems of Using Accelerometers to Measure Angular Rate in Automobiles", Sensors and Actuators A. 25–27, 1991, pp. 821–824.

Primary Examiner—William A. Cuchlinski, Jr.
Assistant Examiner—Edward Pipala
Attorney, Agent, or Firm—Jimmy L. Funke

[57] ABSTRACT

A rollover sensing apparatus and method are provided for predicting rollover and/or pitchover conditions of a vehicle. An angular rate sensor senses attitude rate of the vehicle and an accelerometer measures vertical acceleration of the vehicle. A current attitude angle is estimated by integration, and a future attitude angle is predicted at an advance time as a function of the estimated current attitude angle and sensed attitude rate. The predicted attitude angle is compared to a threshold and an output is produced for indicating a predicted vehicle rollover condition based on the comparison. A vehicle rollover condition about the longitudinal axis of the vehicle is predicted by comparing a future roll angle to a rollover angle threshold, while a pitchover condition about the lateral axis of a vehicle is predicted by comparing a future pitch angle to a pitch angle threshold.

26 Claims, 5 Drawing Sheets

VEHICLE ROLLOVER SENSING USING SHORT-TERM INTEGRATION

BACKGROUND OF THE INVENTION

The present invention generally relates to rollover sensors and, more particularly, to low-cost vehicle rollover sensors for sensing a rollover condition of a vehicle.

Future generation automotive vehicles may increasingly employ safety-related devices that deploy in the event that the vehicle rolls over to provide added protection to the occupants of the vehicle. For example, upon detecting a vehicle rollover condition, a pop-up roll bar can be deployed such that, when activated, the roll bar further extends vertically outward to increase the height of support provided by the roll bar. Other controllable features may include actuating deployment of one or more air bags, such as front or side deployment air bags, or actuating a pretensioner to pretension a restraining device, such as a seat belt or safety harness, to prevent occupants of the vehicle from ejecting from the vehicle or colliding with the roof of the vehicle.

In the past, basic rollover sensors have been employed in automotive vehicles to measure the angular position of the vehicle from which a rollover condition can be determined. The basic rollover sensors have included the use of a pendulum normally hanging vertically downward due to the earth's gravitational force. Many basic automotive sensing devices are employed simply to monitor the angular position of the vehicle relative to a level ground horizontal position. As a consequence, the basic automotive vehicle rollover sensors have generally been susceptible to error when the vehicle travels around a turn or becomes airborne, in which case the earth's gravitational force, which the sensor relies on, may be overcome by other forces.

More recently, sophisticated rollover sensing approaches have been considered. One such approach considered requires the use of six sensors including three accelerometers and three angular rate sensors, also referred to as gyros, all of which are employed together for use in an inertial navigation system which tracks position and attitude of the vehicle. The three accelerometers generally provide lateral, longitudinal, and vertical acceleration measurements of the vehicle, while the three gyros measure pitch rate, roll rate, and yaw rate. However, the more sophisticated rollover sensing approaches generally require a large number of high-precision and expensive sensors. In addition, known sophisticated systems are susceptible to cumulative drift errors, and therefore must be reset occasionally.

It is, therefore, one object of the present invention to provide for vehicle rollover sensing that requires minimal sensed measurement parameters and is relatively immune to errors generally found in conventional automotive-grade sensors. It is another object of the present invention to provide for vehicle rollover sensing for an automotive vehicle that may predict a future rollover condition in advance to allow time to deploy occupant protection measures. It is a further object of the present invention to provide for reliable vehicle rollover sensing in a low-cost sensing module. Yet, it is also an object of the present invention to provide for rollover sensing that requires minimal sensors and is capable of detecting arbitrarily slow vehicle rollovers and handling airborne scenarios.

SUMMARY OF THE INVENTION

In accordance with the teachings of the present invention, a vehicle rollover sensing apparatus and method are provided for predicting an overturn condition of a vehicle. The apparatus includes an angular rate sensor for sensing attitude rate of the vehicle and producing an output signal indicative thereof. The rollover sensing apparatus further includes a short-term integrator having a finite impulse response filter for integrating the angular rate output signal over a period of time and providing an estimate of attitude angle. A predictor predicts a future attitude angle at an advance time as a function of the estimated attitude angle and the sensed attitude rate. The predicted attitude angle is compared to a threshold and an output is produced for indicating a predicted vehicle overturn condition based on the comparison. The vehicle rollover sensing apparatus can predict a rollover about the longitudinal axis of the vehicle by measuring roll rate and predicting a future roll angle. The vehicle rollover sensing apparatus can also predict a pitchover about the lateral axis of the vehicle by measuring pitch rate and predicting a future pitch angle. According to one embodiment, the apparatus may further include an accelerometer for measuring vertical acceleration of the vehicle and producing an output signal thereof, and a long-term integrator for integrating the attitude rate over a delayed period of time. The measured vertical acceleration may also be used to predict an overturn condition.

A method is also provided for predicting an overturn condition of a vehicle. The method includes sensing attitude rate of a vehicle and producing an output signal indicative thereof. A current attitude angle is estimated by integrating the sensed attitude rate over a period of time with a short-term integrator having a finite impulse response filter. A future attitude angle is predicted based on a weighted sum of the estimated attitude angle and sensed attitude rate. The predicted future attitude angle is compared to a threshold value and a vehicle overturn condition signal is deployed based on the comparison. More particularly, the method predicts a vehicle rollover about the longitudinal axis of the vehicle by measuring roll rate and predicting a future roll angle. In addition, the method predicts a pitchover condition about the lateral axis of the vehicle by measuring pitch rate and predicting a future pitch angle. The method may further include sensing vertical acceleration of the vehicle and producing an output signal indicative thereof, as well as a long-term integrator for integrating the attitude rate over a delayed time period.

These and other features, objects, and benefits of the invention will be recognized by those who practice the invention and by those skilled in the art, from reading the following specification and claims, together with reference to the accompanying drawings.

DETAILED DESCRIPTION OF THE PREFERRED EMBODIMENTS

Figure 1:
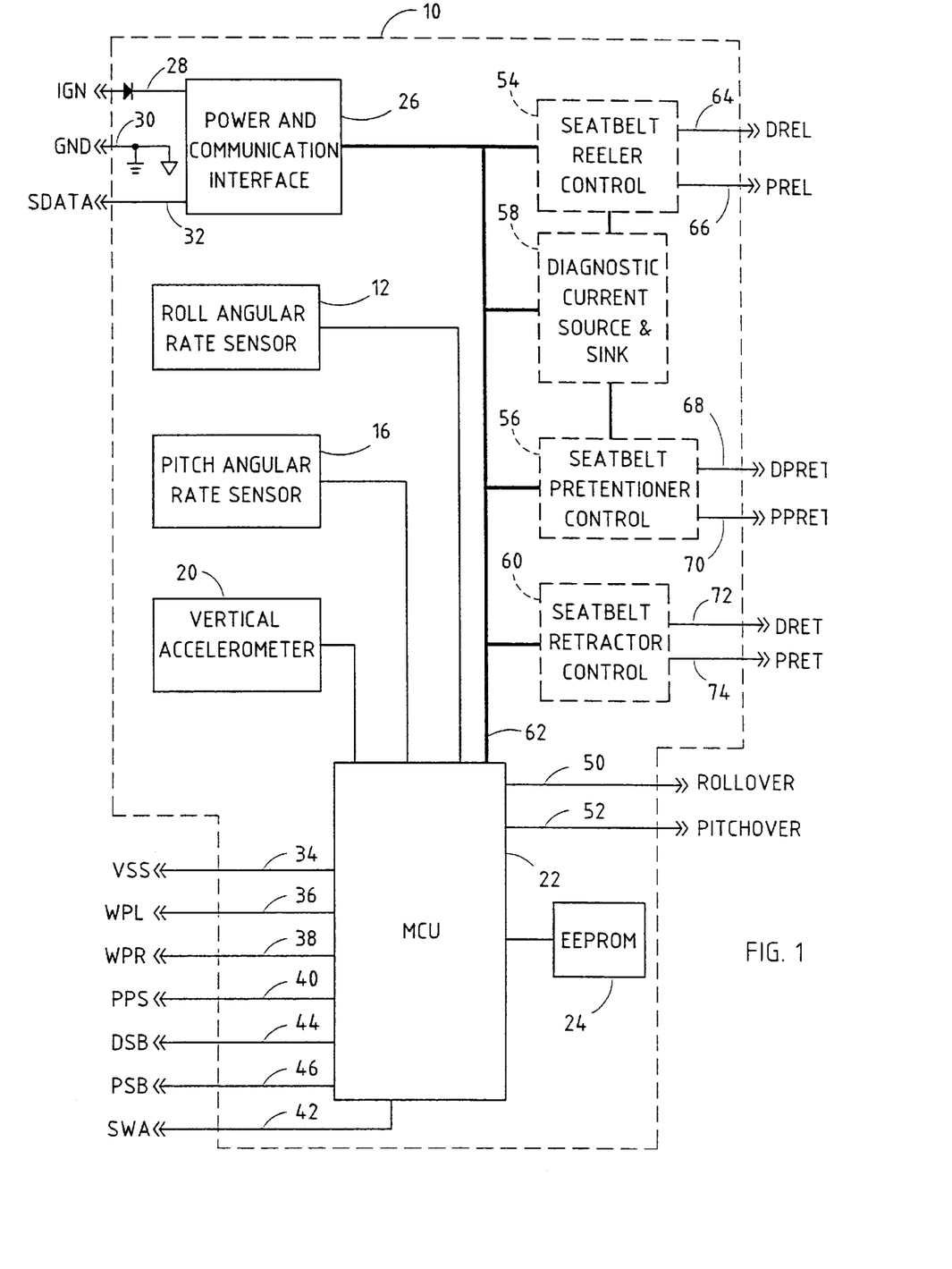
FIG. 1 is a block diagram of a rollover sensing module for sensing vehicle rollover and pitchover according to the present invention.

Referring to FIG. 1, a rollover sensing module 10 is illustrated for use in sensing roll angular rate, pitch angular rate, and vertical acceleration of a vehicle and predicting a rollover and/or pitchover condition of an automotive vehicle (not shown). The rollover sensing module (RSM) 10 of the present invention is preferably mounted on an automotive vehicle and used to predict in advance a future rollover condition of the vehicle. A vehicle rollover condition, as described herein in connection with the present invention, may include side-to-side rotation of the vehicle about the vehicle's longitudinal axis, commonly referred to as a "vehicle rollover," and back-to-front rotation about the vehicle's lateral axis, commonly referred to as a "vehicle pitchover," or a combination of rollover and pitchover. For purposes of describing the rollover sensing of the present invention, the term "rollover" is generally used to refer to either a rollover condition or a pitchover condition.

The rollover sensing module 10 is designed to be located in an automotive vehicle to sense vehicle dynamics and predict a rollover condition of the vehicle. Upon predicting a vehicle rollover condition, the rollover sensing module 10 provides an output signal indicative of the predicted rollover condition. The rollover condition output signal may be supplied to one or more selected vehicle devices, such as safety-related devices, to actuate the selected devices in anticipation of an upcoming rollover. The predicted rollover condition output signal may be employed to deploy a pop-up roll bar to provide extended lateral support to the occupants of the vehicle just prior to the actual vehicle rollover occurring. Similarly, the predicted rollover condition output signal may actuate an occupant restraining device, such as a seat belt or safety harness pretensioner to eliminate slack in the restraining device just prior to the vehicle rollover occurring. Other controlled functions include deployment of front and/or side deployment air bags to protect the vehicle occupants during a vehicle rollover. These and other devices may be controlled in response to the rollover condition output signal.

The rollover sensing module 10 preferably includes up to three sensors, all preferably assembled together on module 10, and oriented to perform the intended sensing operation. The sensors include a roll angular rate sensor 12, a pitch angular rate sensor 16, and a vertical accelerometer 20. The roll angular rate sensor 12 measures the time rate of angular roll about the vehicle's longitudinal axis, while the pitch rate sensor 16 measures the time rate of angular pitch about the vehicle's lateral axis. The vertical accelerometer 20 measures the vertical acceleration of the vehicle along the vehicle's vertical axis. A rollover sensing module having five sensors as described in co-filed U.S. Patent Application No. [TBD, referred to as H-200607], entitled "Vehicle Rollover Sensing," to Jan Schiffmann et al., may be employed by using three of the five available sensors. The aforementioned co-filed application is hereby incorporated by reference.

The rollover sensing module 10 further includes a microprocessor control unit (MCU) 22 for processing sensed vehicle parameters according to a rollover sensing algorithm to predict vehicle rollover and pitchover conditions. MCU 22 is preferably a microprocessor-based controller and, according to one example, may include Model No. HC12 made available by Motorola. Associated with MCU 22 is an electrically erasable programmable read-only memory (EEPROM) 24 that stores various programmed calibrations for performing the rollover sensing algorithm, as is explained hereinafter. The EEPROM 24 can be integrated with the MCU 22 or provided external thereto. Rollover sensing module 10 further includes a power and communication interface 26 for receiving an ignition IGN1 signal on line 28 and communicating via serial data (SDATA) on serial data bus 32. Rollover sensing module 10 is further grounded via ground line 30. Power and communication interface 26 converts an approximately 12-volt DC IGN1 signal input to 5-volts DC for use as a power supply to the components on module 10. Serial data communicated on data bus 32 may include individual sensor outputs and processor outputs as well as programmed inputs.

MCU 22 receives, as inputs, signals from each of sensors 12–20. In addition, the MCU 22 receives other various inputs that may be employed in connection with the rollover detection of the present invention. These inputs may include a vehicle speed sensor (VSS) signal 34 indicative of the speed of the vehicle and auxiliary left and right wheel position sensors (WPL) and (WPR) signals 36 and 38 for providing an indication of whether the wheels on either the left or right side of the vehicle are not in contact with the ground. The auxiliary wheel position sensors signals 36 and 38 are wheel position measurements taken relative to the body of the vehicle. Other inputs include a passenger presence (PPS) signal 40, which may be generated as a sensed output from an occupant presence sensor for purposes of sensing the presence of a passenger. A driver's seat belt (DSB) signal 44 and a passenger's seat belt (PSB) signal 46 indicate the use of driver and passenger seat belts, respectively. Also provided is a steering wheel angle (SWA) signal 42 for providing an indication of the current vehicle steering wheel angle relative to the longitudinal axis of the vehicle.

MCU 22 processes the various input signals, as will be explained hereinafter, and produces output signals identified as ROLLOVER signal 50 and PITCHOVER signal 52, which are indicative of a predicted vehicle rollover condition and a pitchover condition, respectively. In addition, MCU 22 provides the predicted rollover and pitchover output signals on line 62 to control designated onboard control devices, such as a seat belt reeler control 54, a lap seat belt pretensioner control 56, and a seat belt retractor control 60. Seat belt reeler control 54 controls the seat belt reeler for both the driver's side and passenger's side via respective signals DREL and PREL as provided on output line 64 and 66, respectively. Seat belt pretensioner control 56 likewise controls seat belt pretensioning for the driver's side and passenger's side via signals DPRET and PPRET as provided on output lines 68 and 70, respectively. A diagnostic current source and sink 58 allows for diagnostic testing of the seat belt reeler control 54 and seat belt pretensioner 56. The seat belt retractor control 60 controls retractor locks associated with the seat belt to both the driver's seat belt and passenger's seat belt via signals DRET and PRET, as provided on output lines 72 and 74.

Figure 2:
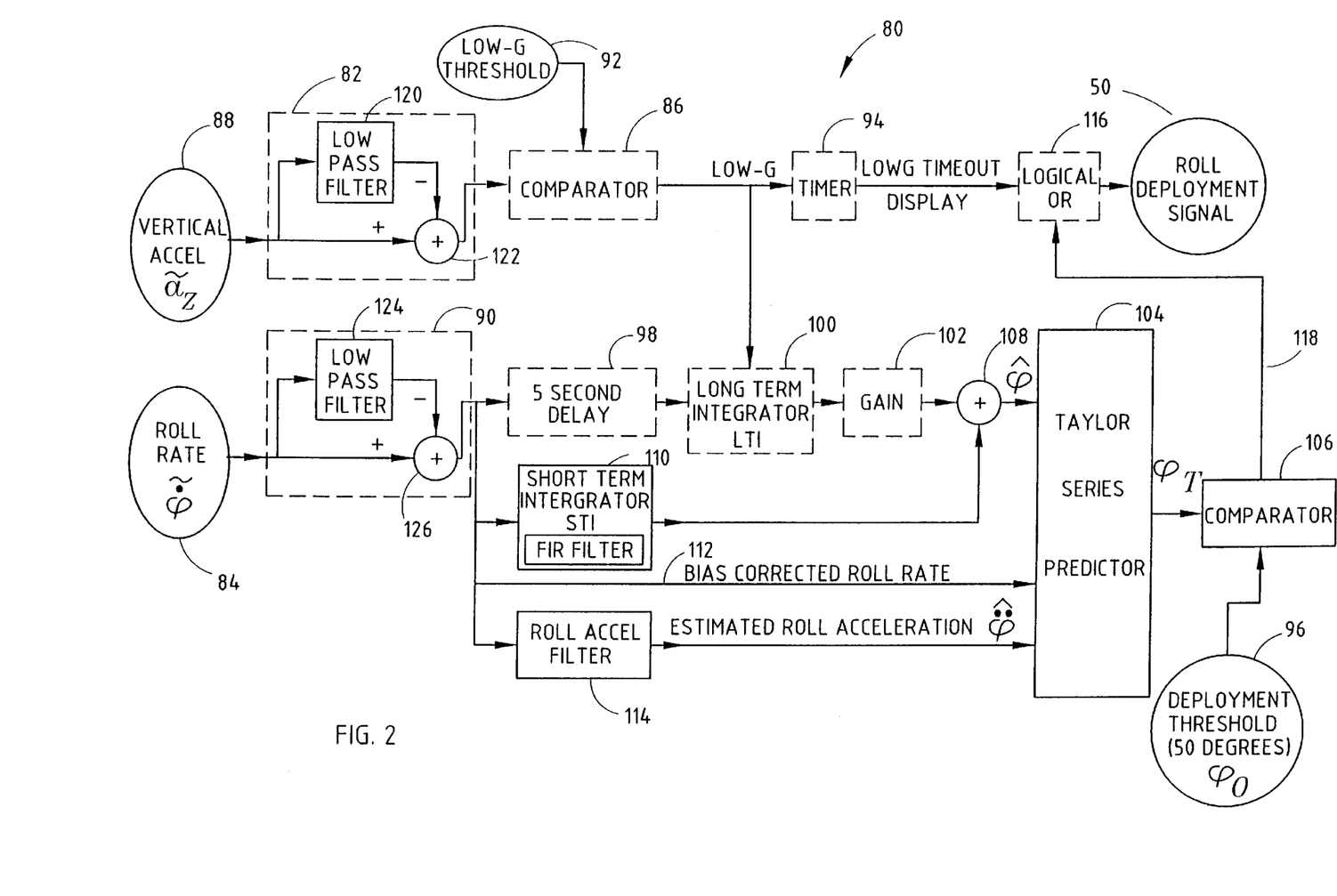
FIG. 2 is a block diagram illustrating a rollover sensing algorithm for predicting vehicle rollover with the rollover sensing module according to the present invention.

Referring to FIG. 2, a rollover prediction algorithm 80 is shown for predicting a vehicle rollover about the longitudinal axis of the vehicle. Rollover prediction algorithm 80 is preferably implemented in software that is stored in EEPROM 24 and operated upon via the microprocessor control unit 22. However, it should be appreciated that the algorithm 80 of predicting a rollover condition of a vehicle according to the present invention can be implemented in analog circuitry as well as digital processing. It should also be appreciated that while a vehicle rollover condition about the vehicle's longitudinal axis is predicted by rollover prediction algorithm 80, algorithm 80 can likewise be used to predict a vehicle pitchover about the lateral axis of the vehicle by sensing pitch angular rate in place of the roll angular rate.

Vehicle rollover prediction algorithm 80 receives a roll rate signal $\dot{\phi}$ 84 from the roll angular rate sensor 12, and a vertical acceleration signal $\alpha_z$ 88 from the vertical accelerometer 20, and processes these signals to predict a vehicle rollover condition. Generally speaking, the vehicle rollover prediction algorithm 80 requires signals generated from an angular rate sensor according to one embodiment and signals generated from both an angular rate sensor and a vertical accelerometer according to another embodiment. For purposes of predicting a rollover condition about the longitudinal axis of the vehicle, the angular rate sensor is the roll angular rate sensor 12. For purposes of predicting a vehicle pitchover condition about the lateral axis of the vehicle, the angular rate sensor is the pitch angular rate sensor 16. In accordance with one embodiment of the present invention, vehicle rollover prediction algorithm 80 utilizes the roll rate signal received from the angular rate sensor 12 and predicts a rollover condition without utilizing the vertical acceleration signal. In accordance with another embodiment of the present invention, the vehicle rollover prediction algorithm 80 utilizes both the roll rate signal received from the roll angular rate sensor 12 and the vertical acceleration signal received from the vertical accelerometer 20 to predict a rollover condition of the vehicle. Accordingly, for monitoring and predicting either a rollover or pitchover condition, algorithm 80 processes measured signals from one or two sensors, whereas to monitor and predict both rollover and pitchover conditions, a total of two or three sensors are generally employed.

The rollover prediction algorithm 80 of FIG. 2 illustrates vehicle rollover condition prediction according to the first embodiment of the present invention which uses both the roll angular rate signal $\dot{\phi}$ 84 received from the angular rate sensor 12 and the vertical acceleration signal $\alpha_z$ 88 received from the vertical accelerometer 20. The second embodiment of the present invention does not employ the vertical acceleration signal $\alpha_z$ 88 received from the vertical accelerometer 20. The second embodiment is generally performed by using the solid line blocks shown in algorithm 80. A description of the rollover prediction algorithm 80 in connection with the first embodiment of the present invention is now provided.

Vehicle rollover prediction algorithm 80 includes a bias-correction circuit 82 which estimates any bias and subtracts the estimated bias from the vertical acceleration measurement $\alpha_z$. Bias-correction circuit 82 includes a low-pass filter 120 preferably having a long-time constant of approximately two minutes, for example. The state of low-pass filter 120 is initialized at key-on by averaging the measurement over a short time period of approximately two seconds, for example, when the vehicle is assumed to be stationary. The low-pass filter 120 produces an average value over a designated period of time which, for example, may be two minutes. The average value output from low-pass filter 120 is applied to a summing junction 122 which subtracts the average value output of low-pass filter 120 from the sensed vertical acceleration signal $\alpha_z$ to produce a bias-corrected vertical acceleration signal.

Rollover prediction algorithm 80 compares the bias-corrected vertical acceleration signal to a low-G threshold value 92 via comparator 86 which produces a logic signal labeled LOWG. The low-G threshold value 92 is set to the value of vertical acceleration which would be realized if the vehicle were stationary and tilted on an angle of approximately forty-five degrees (45°). Thus, the comparison by comparator 86 produces logic signal LOWG which assumes a true (e.g., high) logic state if the bias-corrected vertical acceleration is more positive than the low-G threshold value 92. Otherwise, logic signal LOWG assumes a false (e.g., low) logic state. The logic signal LOWG will remain in a true logic state if the vehicle is airborne or if the vehicle is tilted at an angle of forty-five degrees (45°) or higher.

Logic signal LOWG is essentially a flag that is used to activate portions of the rollover detection algorithm 80 which will help to predict slow rollover conditions of the vehicle. In order to respond to a true logic state of logic signal LOWG over a sufficient period of time, algorithm 80 further includes a timer 94 which counts the time during which the logic signal LOWG remains in a true logic state. Anytime that logic signal LOWG is false, the count of timer 94 decays rapidly. Hence, if logic signal LOWG is switching between true and false logic states, the timer count will remain near zero. However, if the timer count exceeds a predetermined threshold, currently set at five seconds, the low-G timeout deploy signal output from timer 94 is set to a true logic state. The low-G timeout deploy signal is provided as one input to a logic OR gate 116. The output of logic OR gate 116 provides a roll deployment output signal 50 which indicates the prediction of a rollover condition of a vehicle. Accordingly, the measured vertical acceleration $\alpha_z$ may be employed to predict a rollover condition of a vehicle during conditions when the vehicle is rolling over at a very slow roll rate. According to the one example, a vehicle rollover condition occurring at a rate of five degrees per second (5°/sec.) or slower may be detected by algorithm 80 as indicated by the Low-G Timeout Deploy signal.

The vehicle rollover prediction algorithm 80 likewise includes a bias-correction circuit 90 for providing bias-correction to the measured roll rate signal $\dot{\phi}$. Bias-correction circuit 90 includes a low-pass filter 124 preferably having a long-time constant of approximately two minutes, for example. The low-pass filter 124 has a state initialized at key-on by averaging the measurement over a short time of approximately two seconds, for example, when the vehicle is assumed to be stationary. The low-pass filter 124 produces an average value over a designated period of time which, for example, may be two minutes. The average value output from low-pass filter 124 is applied to a summing junction 126 which subtracts the low-pass filter output from the measured roll rate signal $\dot{\phi}$ to produce a bias-corrected roll rate signal.

The bias-corrected roll rate signal is applied to a long-term integrator (LTI) 100 and a short-term integrator (STI) 110, which process the roll rate signal and produce an estimated current roll angle. The bias-corrected roll rate signal is also input to roll acceleration filter 114 which calculates estimated roll acceleration. The bias-corrected roll rate signal is further applied via line 112 directly to a Taylor series predictor 104.

The roll acceleration filter 114 calculates the derivative of the bias-corrected roll rate to produce an estimated roll acceleration. Roll acceleration filter 114 may include a simple Kalman filter for performing the derivative calculation. The estimated roll acceleration $\ddot{\varphi}$ is also input to the Taylor series predictor 104.

The short-term integrator 110 includes a linear filter such as a finite impulse response (FIR) filter which has as its unit impulse response a five-second pulse of unit amplitude. The short-term integrator 110 is a filter which acts like an integrator for a short period of time, such as approximately five seconds, according to the example herein, without adversely suffering from bias signals. The five-second time interval is sufficient enough for a roll rate of ten degrees per second (10°/sec.) to be integrated up to fifty degrees (50°). After the five second period expires, the response of the short-term integrator 110 preferably decays. It should be appreciated that the use of a finite impulse response filter as a short-term integrator requires available memory in RAM to store approximately one hundred previous values at a loop time of fifty milliseconds, according to one example.

The short-term integrator 110 responds like an integrator to short-term events, such as rollovers, while exhibiting a minimal response to long-term events, such as bias and bias drift. The FIR filter used in the integrator 110 is able to adequately achieve this result, as it represents the integrator for quick vehicle rollovers. By not responding to long-term events, the short-term integrator 110 may, however, forget any non-level orientation after a while and subsequently may believe that the vehicle is level, until another short-term event occurs.

The estimated current roll angle produced by the short-term integrator 110 is output to a summing junction 108 which either uses the value directly for short-term events or adds the value with that produced from a gain adjusted long-term integrator 100 for longer events, to provide the estimated current roll angle. The summing junction 108 outputs the estimated current roll angle to the Taylor series predictor 104.

The long-term integrator 100 is preferably implemented with an infinite impulse response (FIR) filter. The long-term integrator 100 receives the bias-corrected roll rate delayed by five seconds via delay 98. The five-second delay 98 ensures that the short-term integrator 110 will generate the estimated roll angle for the initial five seconds. After the five-second delay, the estimated roll angle may become the sum of the outputs of the long-term and short-term integrators 100 and 110. The long-term integrator 100 further receives the logic signal LOWG which is required to be in a true logic state for the long-termn integrator 100 to perform integration. In effect, the long-term integrator 100 extends the range of the detectable roll rates below ten degrees per second (10°/sec.) by receiving the delayed bias corrected roll rate and the logic signal LOWG and producing a long-term integrated output roll angle value. With the five-second delay via delay 98, the long-term integrator output, which may be adjusted via gain 102, is summed with the short-term integrator output 110 via summing junction 108 to result in what is effectively a pure integrator, whenever logic signal LOWG is set to a true logic level.

Accordingly, the short-term integrator 110 provides as an output the integral of its input over the previous five-second interval which enables the algorithm 80 to detect rollover rates as low as ten degrees per second (10°/sec.), with adequate warning time relative to the deployment threshold. To extend the range of detectable roll rates below the rollover rate of ten degrees per second (10°/sec.), the logic signal LOWG is used to activate the long-term integrator 100. With the five-second delay of delay 98, the long-term integrator 100 output is added to the output of the short-term integrator 110 which results in effectively a pure integrator whenever the logic signal LOWG is in a true state. Thus, low vehicle roll rates will eventually cause the deployment indication. With the current calibrations, the low-G timeout deployment signal handles rolls of five degrees per second (5°/sec.) or slower, the long-term integrator 100 combined with the short-term integrator 110 handles roll rates of between five and ten degrees per second (5°–10°/sec.), and the short-term integrator 110 alone handles roll rates over ten degrees per second (10°/sec.) to provide vehicle rollover prediction throughout a large range of possible vehicle roll rates.

The gain block 102 controls the gain of the output of the long-term integrator 100 and is normally set to a gain value of one. The gain block 102 could be set to zero to disable the long-term integrator 100, or it could be set to values greater than one to emphasize the long-term integrator output. During a slow constant roll rate scenario, there is a delay between the time the short-term integrator 110 output reaches its maximum, and the time the low-G condition begins. If desired, a gain greater than one could be used to compensate for the delay by over-emphasizing the contribution of the long-term integrator 100, thereby allowing the estimated current roll angle to catch up with and eventually pass the actual value.

The Taylor series predictor 104 generates the predicted roll angle $\varphi_T$ as a function of the estimated roll acceleration $\ddot{\varphi}$ the bias-corrected roll rate, and the estimated current roll angle $\hat{\varphi}$. With the Taylor series predictor 104, the vehicle rollover prediction algorithm 80 predicts a roll angle $\varphi_T$ an advance time T into the future. The roll angle time-history in the neighborhood of the current time is approximated by the Taylor series predictor 104, which may be approximated as follows:

$$\varphi_T = \hat{\varphi} + T\tilde{\varphi} + \frac{1}{2}T^2\ddot{\varphi}$$

The Taylor series prediction of the predicted roll angler $\varphi_T$ therefore a function of the estimate of the current roll angle $\hat{\varphi}$ summed with the product of the desired warning time T and the measured current value of roll rate $\tilde{\varphi}$ and further summed with the product of the desired warning time squared and the estimate of the current roll acceleration $\ddot{\varphi}$ divided by two. Units for the above equation are radians, seconds, radians-per-second, and radians-per-second squared. The desired warning time may be equal to 500 milliseconds, according to one example, so that enough advance warning is provided to deploy the necessary safety restraint device prior to the actual vehicle rollover condition occurring and before the occupants are too far out of position. Accordingly, the aforementioned Taylor series prediction equation shows that the Taylor series approximation is evaluated according to an advance warning time T. While the above Taylor series prediction equation is shown as a second order equation, it should also be appreciated that a first order equation may be employed, such that the predicted roll angle $\varphi_T$ is equal to the estimated roll angle $\hat{\varphi}$ summed with the product of the desired warning time T and measured current roll rate $\hat{\varphi}$.

The absolute value of the predicted roll angles $\varphi_T$ is then compared with a programmed deployment threshold $\varphi_o$ 96 by way of comparator 106. Deployment threshold $\varphi_o$ 96 is a programmed predetermined threshold value that is used to determine the prediction of a rollover condition. According to one example, deployment threshold $\varphi_o$ is set equal to approximately fifty degrees (50°). Comparator 106 produces an output signal 118 indicative of a predicted rollover condition, when the predicted roll angle $\varphi_T$ greater than the deployment threshold $\varphi_o$. Output signal 118 is applied as an input to logic OR gate 116 which provides as the output the rollover deployment output signal 50. The generated rollover output signal 50 may be employed by any one or more selected devices to deploy occupant safety restraint devices or carry out other functions, as desired.

Figure 3:
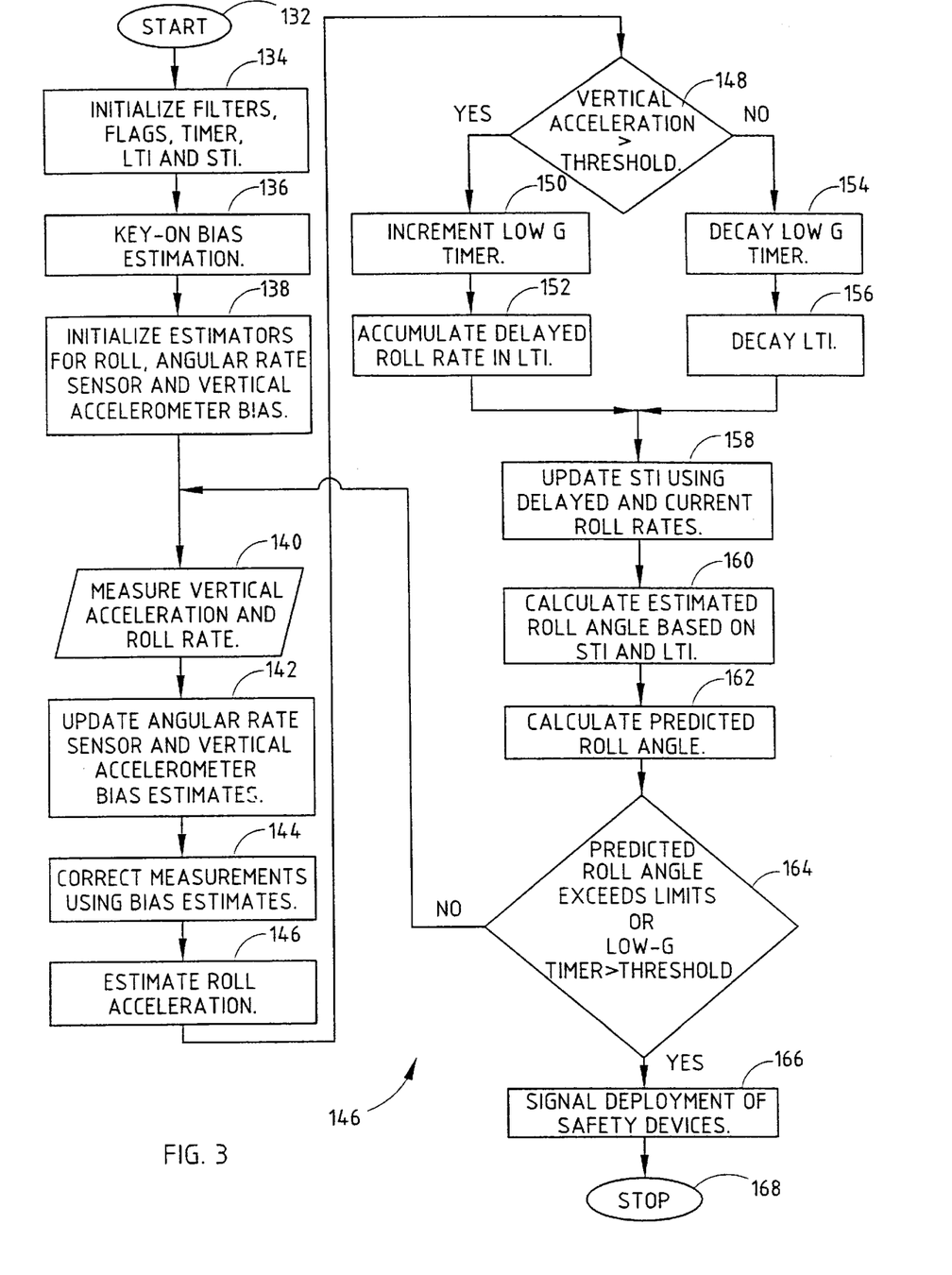
FIG. 3 is a flow diagram illustrating a methodology for sensing a rollover condition of a vehicle according to the present invention.

Referring to FIG. 3, a rollover prediction methodology 130 is shown for predicting a vehicle rollover condition and deploying one or more safety devices in response thereto. Rollover prediction methodology 130 begins with start block 132 and proceeds to initialization block 134 to initialize the filters, flags, timer, long-term integrator, and short-term integrator such that all variables are initialized to zero or other values as appropriate. Deployment flags and any other flags are initialized to their proper initial values, timers are set to zero, and both the short-term integrator and long-term integrator are set to zero. Buffers storing the previous several seconds worth of bias-corrected roll rate measurements are also set to zero.

Next, methodology 130 proceeds to key-on bias estimation block 136 which, when the vehicle's ignition is keyed on, the vertical accelerometer and the angular rate sensor are allowed to stabilize and warm up for a short period of time, as is generally required for such sensors. Thereafter, for a period of approximately one or two seconds, the output of each sensor is averaged to obtain a presumed bias level (i.e., zero offset) for each sensor. According to block 138, the estimators for the roll angular rate sensor bias and the vertical accelerometer bias are initialized. Since the angular rate bias estimator is a low-pass filter which essentially averages the roll rate signal over the last minute or two, this average value is taken to be the bias level for the roll angular rate sensor. Also, this low-pass filter output is initialized to the value found in block 136 for the roll angular rate sensor. The same initialization procedure is carried out for the vertical acceleration bias.

Upon completing initialization, methodology 130 proceeds to measurement block 140 to measure vertical acceleration and roll angular rate via the vertical accelerometer 20 and roll angular rate sensor 12, respectively, and the measured values are recorded. Pursuant to bias update block 142, the roll angular rate and vertical accelerometer bias estimates are updated using the new recorded measurements. The recorded measurements are then corrected using the bias estimates pursuant to block 144. The measured values of roll rate and vertical acceleration are bias-corrected by subtracting out the corresponding estimated bias value.

Rollover prediction methodology 130 proceeds to block 146 to determine an estimated roll acceleration $\ddot{\varphi}$. The estimated roll acceleration is generated by a roll acceleration filter 114, which may include a simple Kalman filter, used to estimate the derivative of the bias-corrected measured roll rate signal. The estimated roll acceleration is then input to the Taylor series predictor 104.

With the bias-corrected vertical acceleration, methodology 130 compares the bias-corrected vertical acceleration to the low-G threshold value 92, as shown in decision block 148. In effect, decision block 148 checks whether the bias-corrected vertical acceleration exceeds a calibration threshold which, according to one example, may be set to a value of 2.67 meters per seconds squared. If the vertical acceleration exceeds the low-G threshold, methodology 130 proceeds to increment the low-G timer 94 pursuant to block 150 such that the current value of the timer 94 is incremented to record the fact that a logic LOWG true condition existed for that time. In block 152, the product of the delayed roll rate (i.e., the roll rate which was recorded a certain amount of time into the past, for example, five seconds) and loop time is added into the value currently held in the long-term integrator 100 accumulator. On the other hand, if the vertical acceleration does not exceed the low-G threshold value 92 as determined by decision block 148, methodology 130 proceeds to decay the low-G timer 94 by multiplying by a fraction less than one, such as a value of 0.9, for example, as provided in block 154. In block 156, the long-term integrator 100 is decayed such that the value held in the long-term integrator 100 accumulator is decayed by multiplying by a fraction less than one, such as a value of 0.9, for example.

Following either of blocks 152 or 156, methodology 130 proceeds to update the short-term integrator 110 using the delayed and current roll rates in block 158. In effect, the value held in the short-term integrator 110 is updated by subtracting out the product of loop time and delayed roll rate, and b) adding in the product of loop time and current roll rate, both of which are bias-corrected. Next, in block 160, methodology 130 calculates the estimated roll angle based on the short-term integrator 110 and long-term integrator 100. An estimate of the current roll angle is obtained by summing the values held in the short-term integrator 110 and long-term integrator 100 accumulators. It should be appreciated that for short-term events, the estimated current roll angle is produced solely from the short-term integrator 110. Additionally, as long as the logic signal LOWG remains in a false state, the long-term integrator 100 is not used such that the short-term integrator 110 produces the estimated current roll angle. Under a logic low-G true condition, the long-term integrator 100 begins accumulating the five-second delayed input values, which when added to the output of the short-term integrator 100, the net effect is the same as if a pure integrator were being used. Once the logic signal LOWG goes to a false logic state, the long-term integrator 100 output rapidly decays to zero, thereby returning the estimated current roll angle to the five-second integral produced from the short-term integrator 110.

Once the estimated roll angle, bias-corrected roll rate, and estimated roll acceleration are determined, the predicted roll angle $\varphi_T$ is determined with the use of the Taylor series predictor 104. The predicted roll angle is preferably calculated by taking a weighted sum of the estimated roll angle, the bias-corrected roll rate, and the estimated roll acceleration. The weighted values used in the weighted sum are preferably calibrations.

The predicted roll angle $\varphi_T$ compared to the limits of the programmed calibration threshold $\varphi_o$ as shown in decision block 164. The predicted roll angle $\varphi_T$ is checked to see if its magnitude exceeds a calibration threshold $\varphi_o$ of approximately fifty degrees (50°), according to one example. Also, as shown in block 164, the low-G timeout deploy value held in the low-G timer 94 is checked to see if it is larger than a calibration threshold. If the predicted roll angle $\varphi_T$ does not exceed the deployment threshold $\varphi_o$ and the low-G timer value does not exceed the calibration threshold, methodology 130 returns to block 140. If either the predicted roll angle $\varphi_T$ exceeds the programmed threshold $\varphi_o$ or the low-G timer exceeds the calibrations threshold, methodology 130 produces a rollover condition output indicative of a predicted vehicle rollover. The predicted rollover output may then signal deployment of safety devices, as provided in block 166, so as to actuate, for example, a pop-up roll bar, a seat belt pretensioner, an air bag, or other selected devices. Following signalling of the deployment of the device(s), methodology 130 is complete pursuant to stop block 168.

According to the second embodiment of the present invention, the roll sensing algorithm 80 and rollover prediction methodology 130 may be used to predict a rollover condition of a vehicle by measuring roll angular rate and not requiring the use of the vertical acceleration signal. In doing so, gain 102 of algorithm 80 may be set equal to zero, such that the long-term integrator output has no affect, while the logic signal LOWG is assumed to remain in a logic false state. As a consequence, the Taylor series predictor 104 receives as inputs the estimated roll acceleration $\ddot{\phi}$ as determined by roll acceleration filter 114, the bias-corrected roll rate as provided on line 112, and the estimated current roll angle $\phi$ as determined solely by the short-term integrator 110. According to this second embodiment, rollover prediction algorithm 80 and methodology 130 may achieve adequate rollover prediction as a function of the roll angular rate, which allows for a further reduction on the number of sensors required. In addition, the second embodiment of algorithm 80 further reduces the processing that is required, including eliminating the need for a long-term integrator.

Figure 4:
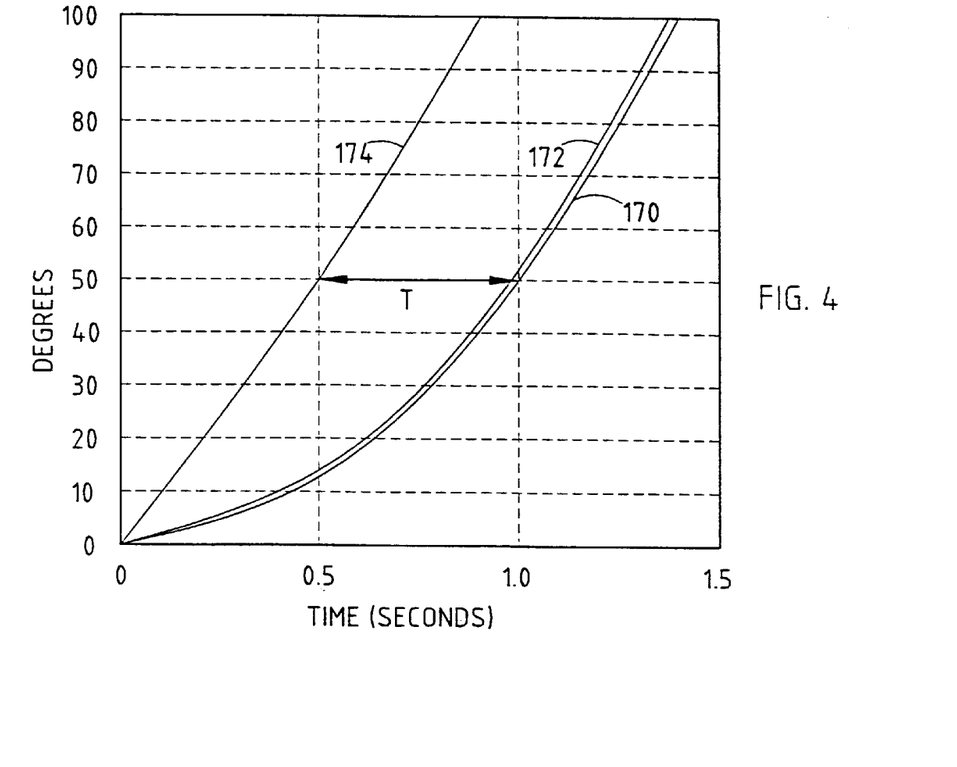
FIG. 4 is a graph illustrating short-term response to a ramp roll rate achieved with the rollover sensing according to the present invention.

FIGS. 4–8 illustrate performance realized with the rollover sensing algorithm 80 and methodology 130 utilizing the rollover sensing module 10 of the present invention, according to illustrative examples. With particular reference to FIG. 4, the algorithm 80 produces a response to a ramp roll rate input, according to one example, in which the short-term response is illustrated for a one hundred degree per second (100°/sec.) ramp. The estimated roll angle 172 follows closely with the actual roll angle 170 which increases rapidly over a short period of time. The short-term integrator 110 estimates the roll angle in an advance time period such that when the predicted roll angle 174 reaches the threshold value of fifty degrees (50°), the algorithm 80 is able to predict a vehicle rollover condition with a warning time T of approximately five hundred milliseconds (500 ms) as shown. Accordingly, algorithm 80 accurately measures angular deviations which occur over short intervals of time, particularly up to five seconds, with the use of the short-term integrator 110.

Figure 5:
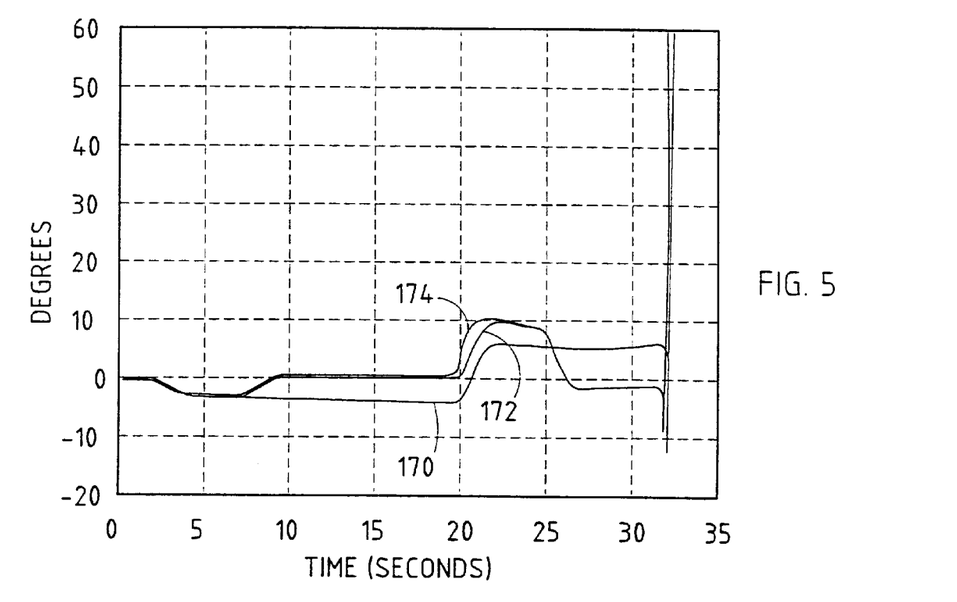
FIG. 5 is a graph illustrating measured response to a simulation of a curb-induced rollover according to one example.
Figure 6:
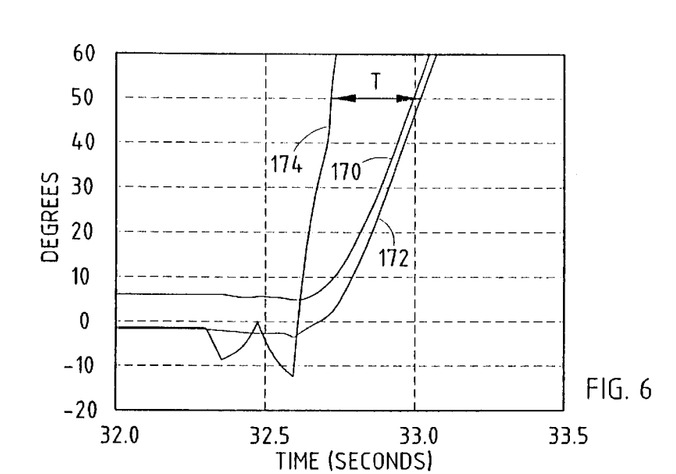
FIG. 6 is a graph further illustrating a portion of the measured response of FIG. 5 with an enlarged time coordinate.

Referring to FIGS. 5 and 6, the response to a curb-induced rollover condition is shown with simulated vehicle data corrupted by sensor errors. The roll angular rate sensor bias estimator and the algorithm 80 were set to have an initial condition of one degree per second (1°/sec.). The estimated roll angle 172 and predicted roll angle 174 follow closely the actual roll angle 170 as measured. However, the short-term integrator 110 may begin to forget a steady angular orientation beyond the five-second integration of the short-term integrator 110, which is more apt to occur with a very slow rollover condition. With particular reference to FIG. 6, the predicted roll angle 174 is determined as a function of both the short-term integrator 110 and long-term integrator 100, which after a time period of approximately 32.54 seconds produces a rollover deployment signal with a warning time T of approximately 250 to 300 milliseconds prior to the actual rollover angle of fifty degrees (50°) being achieved.

Figure 7:
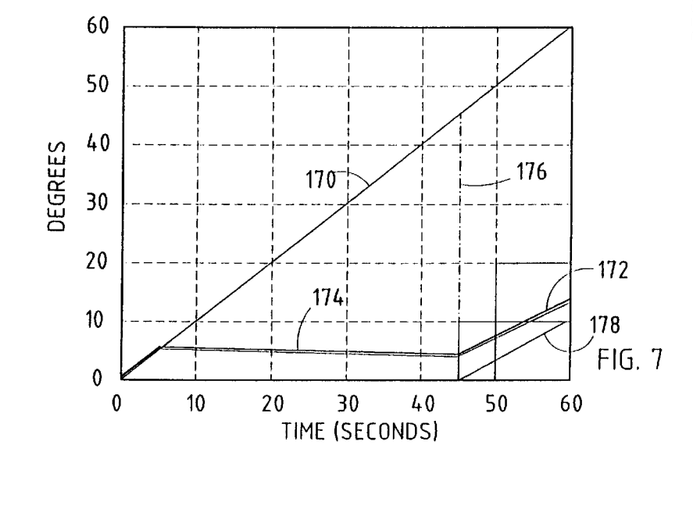
FIG. 7 is a graph illustrating an example of measured response to a constant slow roll rate condition.
Figure 8:
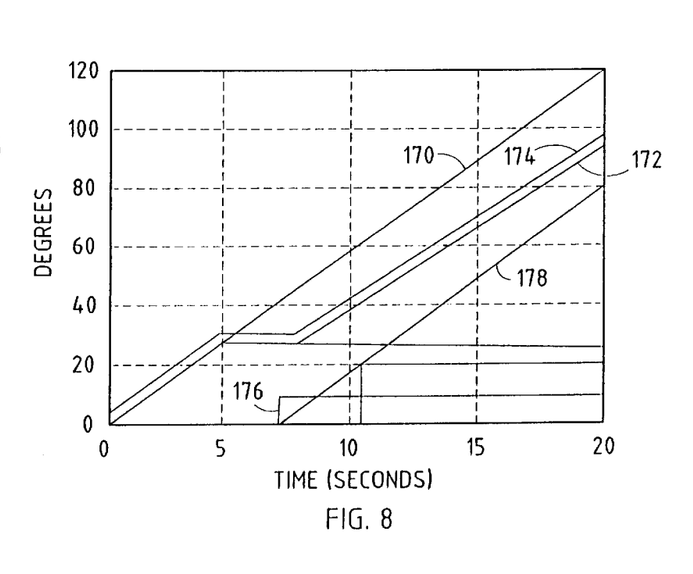
FIG. 8 is a graph further illustrating another example of measured response to a constant slow roll rate condition in which a combined short-term integration and long-term integration are employed to cause a rollover deployment output.

Referring to FIGS. 7 and 8, the performance of the rollover sensing algorithm 80 is shown in response to constant roll rate inputs according to illustrated examples. Particularly with reference to FIG. 7, the constant roll rate is provided at one degree per second (1°/sec.), and the low-G timeout is the cause of deployment. At a time equal to five seconds, the short-term integrator 110 and estimated roll angle saturate at a value of five degrees (5°). At a time of forty-five seconds, the roll angle is forty-five degrees (45°), and the low-G condition 176 is entered. At that time, the long-term integrator 100 output 178 starts growing, which causes the estimated roll angle 172 to also grow. The short-term output remains constant, except for a slight decay due to the roll angular rate bias estimator thinking that the prolonged roll rate is a bias that needs to be eliminated. At a time of fifty seconds, the low-G condition 176 has been in existence for five seconds, thereby causing deployment at an actual roll angle of fifty degrees (50°).

Referring to FIG. 8, the constant roll rate is six degrees per second (6°/sec.), and the short-term integrator 110 output is added with the long-term integrator 100 output, which causes a deployment based on predicted roll angle 174 exceeding the deployment threshold of fifty degrees (50°). At a time of five seconds, the short-term integrator 110 output saturates at thirty degrees (30°). At a time of 7.5 seconds, the low-G condition 176 is entered, and the long-term integrator 100 output 178 starts growing. Also, the estimated current roll angle 172 falls behind the actual roll angle 170 by about fifteen degrees (15°) during that 2.5 seconds. The predicted roll angle 174 reaches the fifty-degree (50°) threshold near a time of eleven seconds, thereby causing deployment prior to the low-G timeout which would have otherwise occurred around a time of 12.5 seconds. Because the estimated roll angle 172 falls behind, it does not trigger until the actual roll angle 170 is about sixty-four degrees (64°).

When used to deploy a safety-related function of the vehicle, the rollover condition prediction methodology 130 may be employed to deploy a non-reusable device. However, it should be appreciated that a resettable rollover condition sensing apparatus may be achieved to repeatedly deploy one or more devices without departing from the teachings of the present invention.

Accordingly, the rollover sensing apparatus and method of the present invention provides a prediction of a rollover condition of a vehicle prior to the actual complete occurrence of a vehicle rollover so that selected devices may be deployed in a timely fashion to provide added protection to occupants of the vehicle. The rollover sensing apparatus of the present invention is relatively immune to substantial errors present in automotive-grade sensors and, therefore, provides enhanced rollover sensing for use with automotive-grade sensors, as well as reducing the number of sensors that may otherwise be required in previously known approaches.

Additionally, while the rollover sensing module 10 has been described herein particularly in connection with the rollover prediction algorithm 80, as set forth in FIG. 2, and the methodology 130 for predicting a rollover condition, as set forth in FIG. 3, about the longitudinal axis of the vehicle, algorithm 80 and methodology 130 as processed by the rollover sensing module 10 may likewise be used to predict a pitchover condition about the lateral axis of the vehicle. In so doing, algorithm 80 would receive a pitch rate signal from pitch angular rate sensor 16 instead of the roll rate signal. For pitchover prediction, algorithm 80 would proceed to determine an estimated pitch acceleration, a bias-corrected pitch rate, and an estimated pitch angle for use in the Taylor series predictor to generate a predicted pitch angle. The predicted pitch angle would then be compared with a deployment threshold value to predict a pitchover condition of the vehicle. Accordingly, the rollover sensing module 10 and rollover prediction algorithm 80 of the present invention may be employed to predict a rollover condition and/or a pitchover condition of a vehicle. It should be appreciated that both a rollover prediction algorithm and a pitchover prediction algorithm can be used together on a vehicle to predict either a rollover or pitchover condition.

Additionally, the rollover sensing module 10 and rollover prediction algorithm 80 of the present invention may further utilize the vehicle speed sensor (VSS) signal and/or wheel position sensor (WPL and WPR) signals for use in detection of a rollover and/or pitchover condition of a vehicle. The vehicle speed sensor signal, under some conditions, can be employed to provide an accurate representation of the vehicle's actual longitudinal acceleration. In addition, knowledge that the vehicle is stopped can aid in the estimation of rollover sensor biases, particularly the angular rate sensor biases. If an inclinometer is made available, the accelerometer biases could also be estimated when the vehicle is known to be stopped. Further, in a situation where models of vehicle dynamics are used in the rollover algorithm, knowledge of the vehicle's speed, obtained from the vehicle speed sensor, would further aid in the rollover condition prediction of the present invention.

The left and right wheel position sensor (WPL and WPR) signals indicate the distance between each wheel center and the vehicle body. The wheel position sensor signals could be used to reduce the incidence of false deployments. The vehicle's suspension springs exert a strong force pushing the wheels away from the vehicle body, such that only contact with the ground keeps the wheels near the body. Centrifugal forces which are present in a rollover situation also work to pull the wheels away from the body. Since a vehicle generally does not rollover without one or more wheels leaving the ground, rollover deployment could be disabled unless at least one wheel is sufficiently far away from the vehicle body as detected by the wheel position sensors. Accordingly, the rollover sensing module 10 and rollover prediction algorithm 80 may utilize the wheel position sensors to provide a predicted rollover and/or pitchover condition output only if either the left or right side wheels of the vehicle are detected as having left the ground.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A rollover sensing apparatus for predicting an overturn condition for a vehicle, comprising:
   an angular rate sensor for sensing attitude rate of a vehicle and producing an output signal indicative thereof;
   a short-term integrator including a finite impulse response filter for integrating the sensed attitude rate signal and producing an estimated current attitude angle;
   a predictor for predicting a future attitude angle as a function of said estimated current attitude angle and said sensed attitude rate;
   a first comparator for comparing said predicted future attitude angle to a threshold value; and
   an output for deploying a vehicle overturn condition based on said comparison of said first comparator.

2. The apparatus as defined in claim 1, further comprising a long-term integrator for integrating said sensed attitude rate signal over a delayed period of time, said long-term integrator producing an output which is further used to determine said estimated current attitude angle.

3. The apparatus as defined in claim 2, further comprising an accelerometer for sensing vertical acceleration of the vehicle and producing an output signal indicative thereof, said predictor predicting said future attitude angle further as a function of said measured vertical acceleration.

4. The apparatus as defined in claim 3, further comprising a second comparator for comparing said sensed vertical acceleration with a threshold value and producing an output for deploying a vehicle overturn condition based on said comparison of said second comparator.

5. The apparatus as defined in claim 1, wherein said predictor comprises a Taylor series-based predictor for providing said prediction of a future attitude angle.

6. The apparatus as defined in claim 1, further comprising a bias estimator for estimating a bias signal and further subtracting said bias signal from said sensed attitude rate signal.

7. The apparatus as defined in claim 1, wherein said angular rate sensor senses roll angular rate of the vehicle, said predictor predicting a future roll angle and comparing said predicted future roll angle to said threshold value to predict a rollover condition of said vehicle about a longitudinal axis of the vehicle.

8. The apparatus as defined in claim 1, wherein said angular rate sensor senses pitch angular rate of said vehicle, said predictor predicting a future pitch rate and comparing said future pitch rate to said threshold value so as to predict a future pitchover condition of said vehicle about a lateral axis of the vehicle.

9. A rollover sensing apparatus for predicting an overturn condition of a vehicle, comprising:
   an angular rate sensor for sensing attitude rate of a vehicle and producing an output signal indicative thereof;
   an accelerometer for measuring vertical acceleration of said vehicle and producing an output signal indicative thereof;
   a short-term integrator including a finite impulse response filter for integrating said sensed attitude rate signal and producing an estimated current attitude angle;
   a long-term integrator for integrating said sensed attitude rate signal over a delayed period of time, said long-term integrator producing an output which is further used to determine said estimated current attitude angle, said long-term integrator being responsive to said measured vertical acceleration;
   a predictor for predicting a future attitude angle as a function of said estimated current attitude angle and said sensed attitude rate;
   a first comparator for comparing said predicted future attitude angle to a threshold value; and
   an output for deploying a vehicle overturn condition based on said comparison of said first comparator.

10. The apparatus as defined in claim 9, wherein said short-term integrator generates said estimated current roll angle for a short initial period of time, said estimated current roll angle being determined further as a function of both said long-term integrator and said short-term integrator for a delayed period of time.

11. The apparatus as defined in claim 9, further comprising a second comparator for comparing said measured vertical acceleration with a threshold value, said second comparator providing an output indicative of a rollover deployment condition based on said comparison of said second comparator.

12. The apparatus as defined in claim 9, wherein said predictor comprises a Taylor series-based predictor for providing said prediction of a future attitude angle.

13. The apparatus as defined in claim 9, wherein said angular rate sensor senses roll angular rate of the vehicle, said predictor predicting a future roll angle and comparing said predicted future roll angle to said threshold value to predict a rollover condition of said vehicle about a longitudinal axis of the vehicle.

14. The apparatus as defined in claim 9, wherein said angular rate sensor senses pitch angular rate of said vehicle, said predictor predicting a future pitch rate and comparing said future pitch rate to said threshold value so as to predict a future pitchover condition of said vehicle about a lateral axis of the vehicle.

15. A method for predicting an overturn condition of a vehicle, said method comprising the steps of:

sensing attitude rate of a vehicle and producing an output signal indicative thereof;

integrating said sensed attitude rate signal with a short-term integrator having a finite impulse response filter and producing an estimated current attitude angle as a function of said integration;

predicting a future attitude angle as a function of said estimated current attitude angle and said sensed attitude rate;

comparing said predicted future attitude angle to a threshold value; and deploying a vehicle overturn condition based on said comparison.

16. The method as defined in claim 15, further comprising the step of integrating said sensed attitude rate signal over a delayed period of time with a long-term integrator and producing an output which is further used to determined said estimated current attitude angle.

17. The method as defined in claim 16, further comprising the step of sensing vertical acceleration of a vehicle and producing an output signal thereof.

18. The method as defined in claim 17, further comprising the step of comparing said vertical acceleration with a threshold value and producing a rollover deployment signal based on said vertical acceleration comparison.

19. The method as defined in claim 15, further comprising the steps of estimating an attitude acceleration and predicting said future attitude angle further as a function of said estimated attitude acceleration.

20. The method as defined in claim 19, wherein said step of predicting further comprises predicting said future attitude angle as a function of said estimated current attitude angle, said roll rate, and said estimated attitude acceleration as a weighted sum.

21. The method as defined in claim 15, wherein said step of sensing attitude rate comprises sensing roll angular rate about a longitudinal axis of the vehicle, wherein a future roll angle is predicted and compared to said threshold value to predict a rollover condition of said vehicle about a longitudinal axis of said vehicle.

22. The method as defined in claim 15, wherein said step of sensing attitude rate comprises sensing pitch angular rate about a lateral axis of the vehicle, wherein a future pitch rate is predicted and compared to said threshold value so as to predict a future pitchover condition of the vehicle about a lateral axis of the vehicle.

23. A method for predicting an overturn condition of a vehicle, said method comprising the steps of:

sensing attitude rate of a vehicle and producing an output signal indicative thereof;

sensing vertical acceleration of the vehicle and producing an output signal indicative thereof;

integrating said sensed attitude rate signal with a short-term integrator having a finite impulse response filter and producing an estimated current attitude angle further as a function of said short-term integrator;

integrating said sensed attitude rate signal over a delayed period of time with a long-term integrator and further estimating said current attitude angle further as a function of said long-term integration;

predicting a future attitude angle as a function of said estimated current attitude angle and said sensed attitude rate;

comparing said predicted future attitude angle to a threshold value; and deploying a vehicle overturn condition based on said comparison.

24. The method as defined in claim 23, further comprising the step of comparing said vertical acceleration with a threshold value and producing a rollover deployment signal based on said vertical acceleration comparison.

25. The method as defined in claim 23, wherein said step of sensing attitude rate comprises sensing roll angular rate about a longitudinal axis of the vehicle, wherein a future roll angle is predicted and compared to said threshold value to predict a rollover condition of said vehicle about a longitudinal axis of said vehicle.

26. The method as defined in claim 23, wherein said step of sensing attitude rate comprises sensing pitch angular rate about a lateral axis of the vehicle, wherein a future pitch rate is predicted and compared to said threshold value so as to predict a future pitchover condition of the vehicle about a lateral axis of the vehicle.

* * * * *